Feb. 3, 1942.     E. G. TUNNICLIFF     2,271,725
MEASURING DEVICE
Filed Dec. 26, 1940
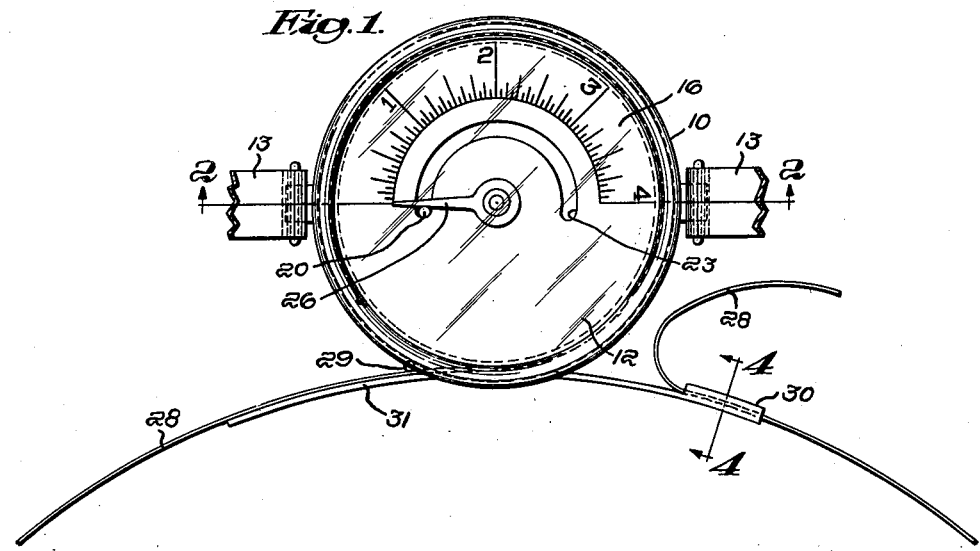
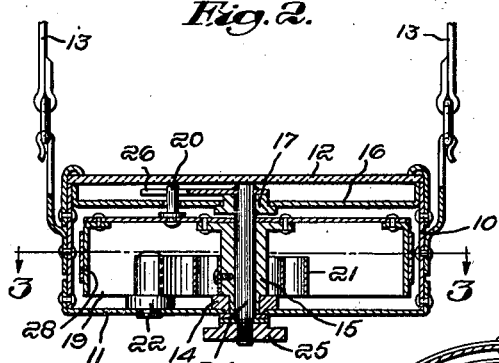
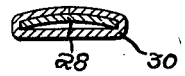
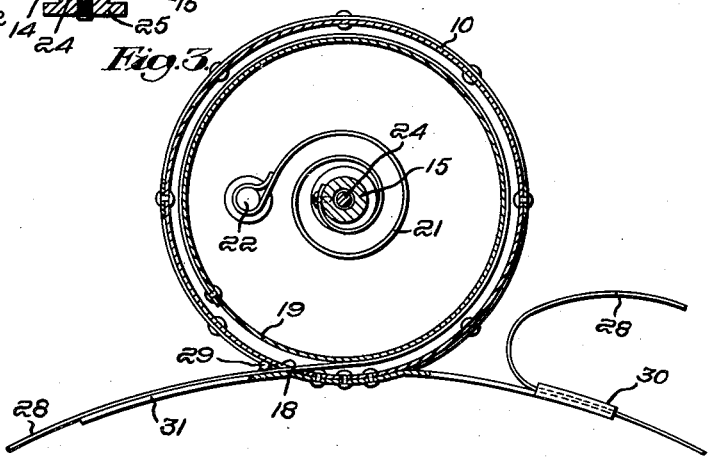
Inventor:
Emma G. Tunnicliff
by Henry & Witter
Attorneys Patented Feb. 3, 1942

2,271,725

UNITED STATES PATENT OFFICE 2,271,725

MEASURING DEVICE

Emma G. Tunnicliff, Boston, Mass.

Application December 26, 1940, Serial No. 371,693

2 Claims. (Cl. 33—179)

The present invention relates to devices for taking bodily measurements of expansion of the chest or any other part of the body of a patient or pupil under physical examination or for exercising purposes. In work with children, for example, it is often desired to make a quick examination for chest expansion or lung capacity at frequent intervals and one object of the present invention is to provide a measuring device suitable for such purposes which may be worn by the examiner, quickly and conveniently applied to the pupil, and which will give an accurate and easily read measurement of the dimensions before and after expansion. More specifically, it is an object of my invention to provide a measuring device of this kind which may be quickly and accurately fitted to pupils of all sizes and which will indicate the desired measurements until reset so that notation of them may be conveniently made. My invention further contemplates a device in which the indicator or pointer may be progressively advanced to a maximum reading if desired in a course of repeated efforts by the pupil. In measuring chest expansion, for example, the pupil may be encouraged to take deeper and deeper breaths in order to advance the indicator to higher and higher readings and the device of my invention is adapted to be used in that manner to encourage in the pupil a desire to increase this expansion— thus building body to correct or overcome speech deficiencies.

Deep breathing is not practiced with sufficient persistency to produce the desired effect in most instances because there is no direct or personal interest in making this health-giving practice a habit. My invention is designed to improve this condition by giving the pupil a definite measurement of his performance and accomplishments and a means of keeping track of his improvement in these respects. This is accomplished in accordance with my invention without subjecting the pupil to undue exhaustion or without unduly alarming him in the course of the examination.

With the foregoing objects in view my invention, in one aspect, consists in a measuring device including in its structure a rotary drum having a projecting actuator and being operated by the movement of a flexible tape passed around the body of the pupil, in combination with an indicator moved by the drum in one direction over a permanent scale and arranged to remain in each position to which it may be progressively moved by the actuator, together with separate means for returning the indicator to initial position.

These and other features of the invention will be best understood and appreciated from the following description of a preferred embodiment thereof selected for purposes of illustration and shown in the accompanying drawing in which—

Fig. 1 is a plan view of the device with certain portions broken away,

Fig. 2 is a view in cross section on the line 2—2 of Fig. 1,

Fig. 3 is a view in horizontal section on the line 3—3 of Fig. 2, and

Fig. 4 is a view in cross section of the clamp on the line 4—4 of Fig. 1.

The device herein illustrated comprises a circular casing 10 having a base 11 and a glass cover plate 12 which together form a closed chamber. The casing as a whole is provided with straps 13 by which the device may be suspended around the neck of the examiner at any desired or convenient height. The base 11 is provided with a flanged circular bushing 14 in which is journaled a hollow upright shaft 15. The casing is also provided with an intermediate scale plate 16, upon which is placed a curved scale reading in inches, but being itself shorter than the graduations indicated thereon. A bushing 17 set in the intermediate plate 16 furnishes a bearing for the upper end of the hollow shaft 15.

The shaft 15 is provided with a flange to which is secured the upper head of a hollow drum 19 open at the bottom. A projecting actuator in the shape of an upright pin 20 extends upwardly from the head of the drum 19 through a circular slot 23 which is formed in the intermediate plate 16 and is arranged in concentric arrangement with the scale of the intermediate plate. A torsion spring 21 like a clock spring is secured to the hollow shaft 15 and to an anchor post 22 projecting from the base 11. This spring tends at all times to rotate the hollow shaft of the drum 19 in a counter-clockwise direction. The casing is provided with an exit slit 18 and through this passes a flexible steel tape 28. This tape is carried about the circumference of the drum 19 and fastened thereto at a point removed about 330° from the exit slit 18. The tape 28 is provided with a projecting stop 29 which engages the casing at the exit slit 18 and limits the winding up movement of the drum and when the stop is so engaged the pin 20 occupies its initial position in the left end of the slot 23 as shown in Fig. 1.

Journaled within the hollow shaft 15 is a solid shaft 24 carrying at its outer end a knurled head 25 and at its inner end a pointer 26 which is arranged to sweep over the scale of the intermediate plate. Between the head 25 and the base 11 is provided a friction washer tending to hold the shaft 24 and the pointer at rest in whatever position they may be moved to by the actuator 20 or by the knurled head 25.

The casing is provided with a curved support or guide 31 shaped somewhat to the contour of the body of the examining wearer and providing a tangential guide for the flexible tape 28 as it issues from the exit slit. The other branch of the support carries a clamp 30 through which the loose end of the tape 28 may be drawn until it is brought into preliminary engagement with the body of the pupil and which then acts to anchor the end of the tape during that particular use of the device. As herein shown the passage of the clamp 30 is slightly narrower than the width of the tape so that it causes it to bind when any strain is imposed upon it. It will be understood that any suitable form of adjustable clamping mechanism may be substituted for that herein shown.

In use the examiner places himself before the pupil, passes the flexible band around the body of the pupil and draws the end of the flexible tape through the clamp 30 in a preliminary measurement. The end of the tape is clamped with the stop 29 at the exit slit 18. The pupil is thereupon instructed to draw a deep breath and as the tape 28 is drawn out of the casing 10 the drum 19 is rotated and the actuator pin 20 advances the pointer 26 across the scale. Repeated efforts may be made by the pupil to carry the pointer to the highest possible point and in each effort the actuator pin leaves the pointer in that position to which it has been moved and returns itself to its initial position. The final reading is noted by the examiner and then the pointer may be turned back to its initial position by manipulation of the knurled head 25.

Having thus disclosed my invention and described one embodiment thereof for illustrative purposes, but not in any limiting sense I claim as new and desire to secure by Letters Patent:

1. A measuring device of the class described, which comprises a casing having an exit slit, a hollow shaft journalled for rotation in said casing, a drum secured to said shaft, a pin secured to the surface of the drum, a scale plate within the casing having an arcuate slot accommodating said pin, a second shaft rotatable within said hollow shaft, a pointer secured to one end of said second shaft and disposed in the path traversed by said pin and engageable therewith, a spring holding the drum in initial position, and a flexible tape connected to the drum and passing out of said casing through the exit slit, whereby a pull on said tape will rotate said drum causing forward movement of said pin and corresponding movement of said pointer across said scale plate.

2. A measuring device of the class described, which comprises a casing having a scale plate provided with an arcuate slot, a shaft disposed in said casing, a drum disposed in said casing for rotation about said shaft as an axis, a pin secured to the surface of the drum and projecting through said arcuate slot, a pointer arranged in the path traversed by said pin and engageable therewith and playing over the surface of said scale plate, and a flexible tape secured to said drum and passing out of said casing, whereby a pull on said tape will cause the drum to rotate, forward movement of the pin causing corresponding movement of the pointer over the surface of the scale plate.

EMMA G. TUNNICLIFF.